Figures 1, 2:
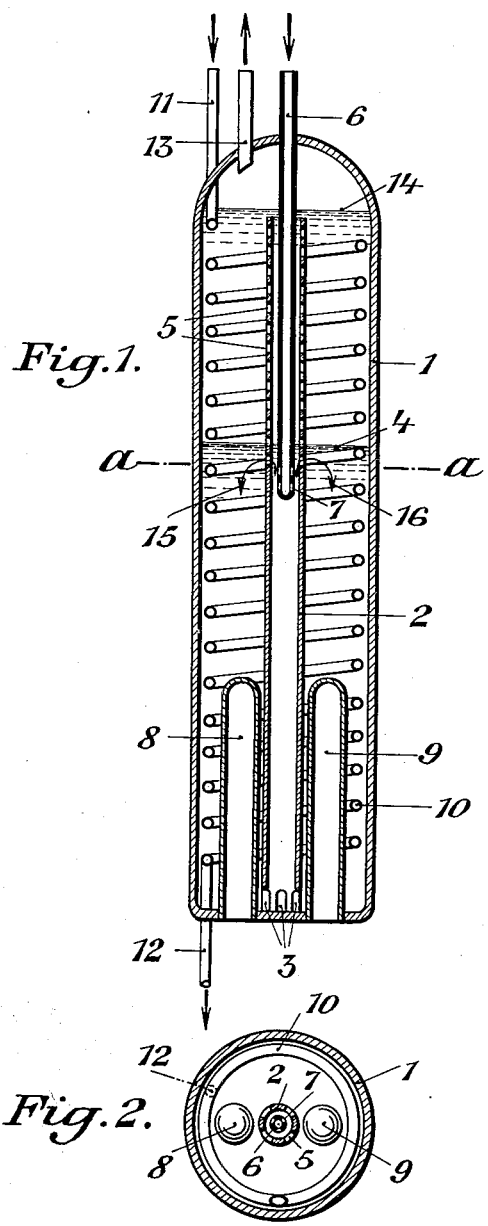

Sept. 3, 1929.  G. FERGUSON  1,726,699
INTERMITTENTLY OPERATING ABSORPTION REFRIGERATING MACHINE
Filed Dec. 17, 1927

INVENTOR:
George Ferguson
BY
Pennie, Davis, Marvin & Edmonds
ATTORNEYS

Patented Sept. 3, 1929.

1,726,699

UNITED STATES PATENT OFFICE.

GEORGE FERGUSON, OF WINTERTHUR-WULFLINGEN, SWITZERLAND, ASSIGNOR TO THE FIRM SULZER FRERES SOCIETE ANONYME, OF WINTERTHUR, SWITZERLAND.

INTERMITTENTLY-OPERATING ABSORPTION REFRIGERATING MACHINE.

Application filed December 17, 1927, Serial No. 240,692, and in Switzerland December 24, 1926.

This invention relates to intermittently operating absorption refrigerating machines and has for its object to provide an improved form of generator-absorber for use in such machines.

According to the present invention the outlet end of the pipe supplying refrigerant vapour to the generator-absorber is disposed within and closely surrounded by a tube having perforations in its lower end through which the weak solution enters on its way to the vapour supply pipe outlet, or absorption point, at a rate depending upon the quantity of refrigerant vapour to be absorbed and in a manner to promote circulation of the liquid.

Preferably the generator-absorber is in the form of a long cylindrical vessel having concentrically disposed therein the weak solution supply tube furnished with circulation orifices in its upper portion and the absorption point, or outlet end of the vapour supply pipe may be arranged slightly below the lowermost level of the liquid in the generator-absorber in order that the incoming vapour may meet with as little resistance as possible.

The invention may be carried into practice in various ways but one construction according thereto is illustrated by way of example in the accompanying drawing, in which Figure 1 is a vertical section through a generator-absorber, and Figure 2 is a cross-section on the line a—a in Figure 1.

In the construction illustrated in the drawing the generator-absorber 1 is in the form of a long cylindrical vessel within which is concentrically disposed a tube 2 having holes 3 at its lower end and circulation orifices 5 in its upper portion. These orifices 5 extend down to a point a little below the lowermost level 4 assumed by the liquid in the generator absorber.

The pipe 6 for supplying the refrigerant vapour terminates a short distance below the lowermost level 4 assumed by the liquid and is disposed concentrically within the tube 2, which closely surrounds it. The lower end of the pipe 6 is perforated as at 7 to provide an outlet for the vapour and, as will be seen from Figure 1, forms an absorption point having a relatively small surface.

The device for supplying heat during the generation period is disposed within the chambers 8 and 9 while during the absorption period cooling water is supplied to the coil 10 through a pipe 11 and led away through the pipe 12. The vapour expelled during generation passes out through a pipe 13 into the condenser, not shown in the drawing.

The manner of operation of the apparatus is as follows.

At the beginning of a heating or generation period the liquid in the generator-absorber stands at the level 14. The heat from the device mounted within the chambers 8 and 9 expels refrigerant vapour from the solution, this vapour passing out into the condenser through the pipe 13, while the level of the solution gradually sinks until at the end of the generation period it has fallen to the lowermost level 4.

Owing to the construction of the generator-absorber according to the invention the expelled vapour is forced to pass through a column of liquid disposed above the heating device, this column being of such dimensions that the solvent contained in the vapour is retained and prevented from passing out into the condenser, so that the generator-absorber also serves as a rectifier.

At the end of a generation period the heat is automatically switched off, and the cooling water simultaneously turned on by means of mechanism forming no part of the present invention and therefore not illustrated in the drawing, whereupon the absorption period begins. The vapour enters through the pipe 6 and as the absorption point 7 is disposed only a little below the lowermost level 4 of the liquid in the vessel 1 the bubbles of vapour meet with a relatively slightly resistance. The bubbles first come into contact with the weak solution in the tube 2 and at the same time set up a circulation in the direction of the arrows 15 and 16, causing the enriched solution to pass out through the orifices 5 into the part of the generator-absorber subjected to the cooling effect of the water passing through the coil 10.

The vapour bubbles rising in the tube 2 from the point 7 set up a suction effect in the tube 2 which causes the weak solution to rise through the holes 3 from the lowermost part of the generator absorber, the rate of flow of weak solution up the pipe 2 depending upon the rate at which vapour enters through the pipe 6. Thus solution which is in a condition to absorb vapour is always at the disposal of the gas entering at 7 and the absorption therefore takes place rapidly and vigorously. Also the supply of weak solution is automatically regulated in accordance with the amount of vapour to be absorbed.

It will be appreciated that in addition to the good circulation which is obtained the generator-absorber according to the invention is of very simple construction and can therefore be manufactured very cheaply.

I claim:

1. In an intermittently operating absorption refrigerating machine the combination of a generator-absorber with a cooling device disposed within the generator-absorber, a pipe supplying refrigerant vapour to the generator-absorber and having its outlet end disposed within and closely surrounded by a tube arranged within the cooling device and having perforations in its lower end, through which the weak solution enters on its way to the vapour supply pipe outlet, or absorption point, at a rate depending upon the quantity of refrigerant vapour to be absorbed and in a manner to promote a suction effect and thereby circulation of the liquid.

2. In an intermittently operating absorption refrigerating machine the combination of a generator-absorber with a cooling device disposed within the generator-absorber, a pipe supplying refrigerant vapour to the generator-absorber and having its outlet end disposed within and closely surrounded by a tube arranged within the cooling device and having perforations in its lower and circulation orifices in its upper portion, through which the weak solution enters on its way to the vapour supply pipe outlet, or absorption point, at a rate depending upon the quantity of refrigerant vapour to be absorbed and in a manner to promote a suction effect and thereby circulation of the liquid.

3. In an intermittently operating absorption refrigerating machine the combination of the generator-absorber with a cooling device disposed within the generator-absorber, a pipe supplying refrigerant vapour to the generator-absorber and having its outlet end disposed slightly below the lowermost liquid-level and within and closely surrounded by a tube arranged within the cooling device and having perforations in its lower end, through which the weak solution enters on its way to the vapour supply pipe outlet, or absorption point, at a rate depending upon the quantity of refrigerant vapour to be absorbed and in a manner to promote a suction effect and thereby circulation of the liquid.

In testimony whereof I have affixed my signature.

GEORGE FERGUSON.